March 9, 1965     T. W. JOHNSON     3,172,447
HIGH SPEED SAFETY WHEEL AND COMPONENTS THEREFOR
Filed Feb. 27, 1962

INVENTOR
Tilden W. Johnson

3,172,447
HIGH SPEED SAFETY WHEEL AND COMPONENTS THEREFOR
Tilden W. Johnson, 5630 Sawtelle Blvd., Culver City, Calif.
Filed Feb. 27, 1962, Ser. No. 175,926
7 Claims. (Cl. 152—397)

This invention relates to improvements in a tubeless tire to provide higher all-around factors of safety for pneumatic wheel assemblies capped by tubeless tires.

Modern high speed travel over roads subject to concrete cracks and ridges would be impractical but for the flexible quick yielding to road obstructions provided by pneumatic tires. For example, an iron wheel striking some road obstructions at high speed can produce for short distances a million pounds of potential impact forces to crush the road obstruction, warp or bend the wheel or throw the car high into the air, but by contrast, a quick yielding pneumatic tire cushions these impacts by yielding quickly through greater distances, thus preventing the development of unmanageable impact forces caused by sudden impact of rigid articles.

Because of these high impact forces encountered at high speeds, it has been a practical necessity to construct wheel major assembly components with continuous unbroken circumferences to prevent possible wheel lumps creating these high car and wheel wrecking impact forces.

Heretofore, as a result of the above mentioned facts, it has been necessary to cap a pneumatic wheel assembly with an unbroken rolling circumference pneumatic tire mated to a continuously unbroken rolling circumference rim in such a manner that loss of tire air created a dangerous wheel drop and drag upsetting the braking system of the car and causing car wrecks and deaths and injuries.

Heretofore, pneumatic wheel assemblies capped with tubeless tires lacked adequate sidewall load factors of safety for curve and dirt curve negotiation to prevent dirt wedging the tire from the rim causing loss of air, and said assemblies also lacked the all-around factors of safety for loads in all directions required for comparable aircraft manufacture required by the Federal Aviation Agency and city, county and state building departments.

Heretofore, it has been sought to rectify the weaknesses of pneumatic wheel assemblies capped by tubeless tires by various tire buffering devices which are difficult to install and assemble with modern tires and rims and lack the flexibility and strength such buffers should provide.

It is the object of this invention to provide a method of manufacturing and combining the components of a tubeless tire to provide a tubeless tire capable of being combined in a pneumatic wheel assembly that substantially retains all the advantages and strengths of modern wheel assemblies plus substantial increase in the all-around factors of safety of pneumatic wheels, especially as regards sidewalls resistance to loss of tubeless tire air, and wheel drop following a blow-out, and retention of braking control following loss of air.

Other objects and advantages of this invention will further become apparent hereinafter and in the drawings in which.

Figure 3:
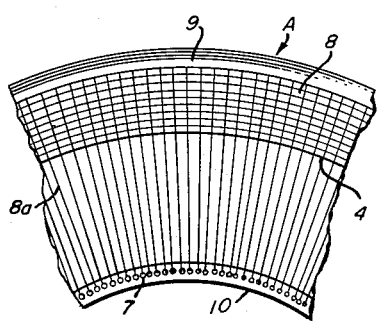

FIGURE 3 is a typical fragmentary elevation view of the tire and sidewall 5 carcass reinforcement pattern that provides for sidewall 5 circumferential extensibility, including bead 6 of tire "A."

Figure 1:
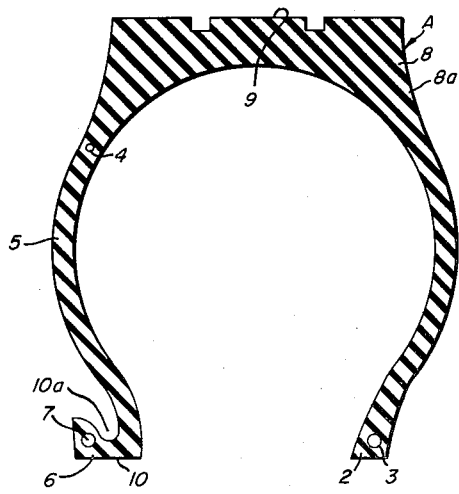
FIGURE 1 shows in radial section a tubeless tire manufactured according to this invention with one hooked bead with recess 10a to receive a tire bead core strap as shown 10b, 10c.
Figure 1A:
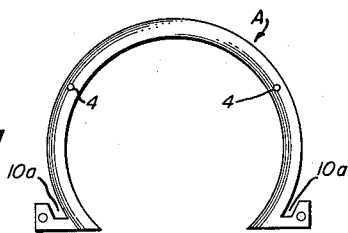

FIGURE 1a shows another species of this invention with both tire beads hooked and sidewalls extensible.

Figure 1B:
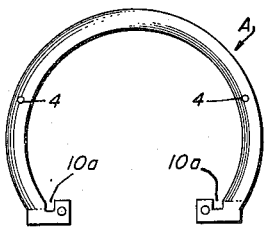
Figure 2:
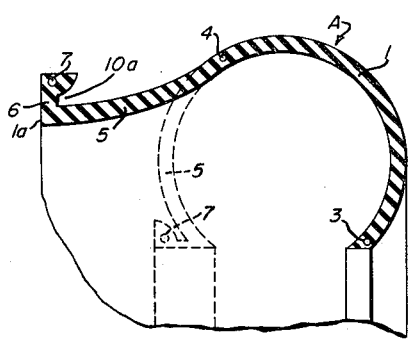
FIGURE 2 is a fragmentary extended radial section illustrating the extensibility of sidewall 5 and bead 6 of "A" for loading over inner safety devices.

FIGURE 1b shows another species with both hooks inward.

Figure 1Y:
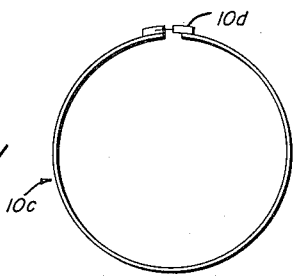
Figure 1X:
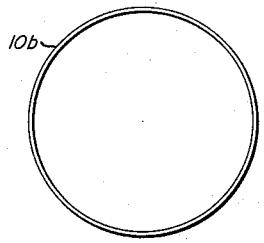

FIGURE 1x represents an unbroken tire bead core strap that can be used in some cases where air or mechanical pressure can force the tire with the strap in recess 10a to form an airtight seal, or fit to the rim.

FIGURE 1y shows a tire bead strap or flange capable of attachment at its ends to any currently available band tightening device to form an airtight seal by compressing tire bead rubber between said tightened strap and the rim bead seat.

Referring to the drawings by letters and numbers:

The letter "A" represents the entire novel type tubeless tire or tire of this invention with one or more tire beads and adjacent sidewall annulus circumferentially extensible at one or more points for mounting over pneumatic tires at one or more points for mounting over pneumatic tires or tire supporting means that are wide, flexible and strong enough to act as secondary tires in case tire "A" loses its air. For example any standard rim, either drop center or removable flange type can be equipped with a wide flexible 1 to 4 inches high inside buffer similar to a combat tire that can operate without air. Then this tire can be stretched over this adequate rim buffer and then made to form an airtight seal with the rim by tightening a bead strap in the tire's hooked beads. This can be accomplished by air pressure, mechanical pressure or clamp tightening.

Numeral 1 represents a normal substantially inextensible fabric reinforced tire or tubeless tire cap and sidewall and is no part of this invention except when the special reinforcement pattern shown in FIGURE 3 is used.

Numeral 2 represents the normal substantially inextensible tubeless tire bead and is no part of this invention except when the special reinforcement pattern is used as shown in FIGURE 3.

Numeral 3 represents the normal tire or tubeless tire's substantially inextensible tire bead core of wire or similar material and is no part of this invention except when used as an anchor for the special reinforcement pattern shown in FIGURE 3.

Numeral 4 represents the termination of circumferential wheel rolling tire fabric, wire or like material thus making it possible to stretch the remaining tire sidewall as represented by numeral 5 and its adjacent tire hooked bead over said inner buffers.

Numeral 5 represents generally the tire or tubeless tire sidewall made circumferentially extensible throughout an annulus or section adjoining a similarly extensible tire hooked bead. It should be noted that while this tire section or annulus can be stretched for loading that it will not bulge when inflated because the tire carcass fabric reinforcements running radially around the tire will prevent a bulge for once the hooked bead is strapped to the rim by a tire hooked bead strap the tire can no longer stretch circumferentially as long as the cross section reinforcement prevents a bulge starting. Thus the tire "A" can be stretched loaded over suitable rim buffers but once fitted to the rim and inflated performs substantially as a currently constructed tire performs.

It should be noted that this special tire reinforcement pattern while only shown as one pattern will in practice come in one or more plies which may or in some circumstances may not be bonded together throughout the extensible section. Likewise it should be noted the inside air retaining material over this extensible section may or in some cases may not be bonded to the plies of carcass reinforcements impregnated with rubber or rubber like material. Likewise, it should be noted that these alternate carcass reinforcements may crisscross each other in slight diagonal directions in practice, which will tend to resist tire bulging under pressure throughout the extensible sections.

Numeral 6 represents the hooked tire bead novel in the sense that it is constructed of materials making possible a tensioning to an airtight fit to a rim by use of a tire bead strap in its recess 10a.

Numeral 7 represents the plurally segmental hollow bead wire or ring that anchors the tire cross section reinforcements and prevents tire inflation pressure pulling the hooked bead under the hooked bead strap tensioned to an airtight fit in hooked bead recess 10a. These ring-like anchors composed of suitable material may in some cases be cut so that cross section reinforcements can be more easily anchored thereto by doubling them through said anchoring rings. In practice, these cross section reinforcements may be so numerous as to touch each other side by side though held together by being impregnated in suitable material capable of extension. It should be noted this construction enables the tire carcass to take all strain required by inflation of the tire leaving the air sealing material over the extensible section and under the tire hooked bead subject to no tension forces.

Numeral 8 represents circumferential wheel rolling tire carcass reinforcements similar to numeral 4 that begins at numeral 4 and supplements the cross section reinforcements throughout any part of the tire to be constructed as substantially inextensible as shown in FIGURE 3.

Numeral 8a represents the aforesaid tire carcass plys cross section reinforcements that anchor to the inextensible tire bead wires or to the aforesaid plurally segmental ring-like anchors in the said hooked beads.

Numeral 9 represents the tire "A" 's tread cap and is no part of this invention except for being bonded over the special tire carcass and carcass reinforcement pattern shown in FIGURE 3.

Numeral 10 represents the airsealing material on the tire hooked bead that contacts the rim bead seat and extends inside the tire. It may or may not be bonded to the extensible tire carcass over the extensible sidewall section or annulus.

Numeral 10a represents the hooked bead recess that receives the tire bead core strap, flange, cable or similar material strap which strap can be tightened by a clamp or inflation or mechanical pressure to compress hooked bead air sealing material between the said strap and the rim bead seat to an airtight seal.

Numeral 10b as shown in FIGURE 1x represents a continuously unbroken substantially inextensible tire bead strap, flange or cable that can be placed in said hooked bead recess 10a and then inflation pressure is used to force an airtight fit and as the hooked bead containing in recess 10a said strap is forced by inflation pressure over the rim bead seat with sufficient force to compress to an airtight fit said hooked bead air sealing material between said strap and the rim bead seat. The same effect can be achieved by using a rim flange drawn into place by bolts to force said loaded hooked bead over the rim bead seat. Where, for example, the tires have two inward hooked beads and a combat tire like buffer is used said buffer flanges can be fitted into said hooked bead's recess and the thus combined inner buffer and tire "A" forced to an airtight fit over rim bead seats by using a removable flange rim boltable to an airtight fit as said loaded hooked beads are forced mechanically over rim bead seats. Likewise, in normal drop center rims suitable inner buffer can be installed in the rims still leaving some drop center into which strap 10b and the hooked bead are loaded and fitted and then air inflation pressure used to secure airtight tire fits just like the current inextensible tubeless tire beads are forced into airtight fits over rim bead seats.

Numeral 10c in FIGURE 1y represents a broken tire bead strap with any suitable clamp (which clamp is no part of this invention, several being available) denominated 10d which can be used to compress the air sealing material 10 of hooked bead 6 between said tensionable strap 10c and the rim bead seat to form an airtight fit.

Several embodiments have been described varying to rim type used and inflation pressure and tonnage of vehicle used. The preferred embodiment therefore is that most adapted to the class of use.

From the foregoing detailed description and drawings, it is apparent I have invented a novel extensible bead and adjacent annulus tubeless tire with a manufacture whereby a substantially inextensible tire core cable, flange, strap or similar device either continuously unbroken or broken with a clamp for tensioning can be tensioned around a hooked bead so as to compress air sealing material between said tensioned strap and the rim bead seat to an airtight fit.

From the foregoing description it is apparent this novel type tire or tubeless tire retains substantially all the advantages of currently manufactured substantially inextensible tubeless tires or tires plus the new advantage of enabling a pneumatic wheel assembly of components that will increase the all around factors of safety of pneumatic wheels, the object of this invention, that is this tire can be stretch loaded over tire supporting means of adequate strength and flexibility to act as secondary non-pneumatic tires suitable for high speed travel over roads, and then said novel tire of this invention can perform loaded substantially as the present inextensible tire or tubeless tires.

Having now described and illustrated one form of my invention and species thereof, I wish it to be understood that my invention is not to be limited to the specific form or arrangement or parts herein described and shown, or specifically covered by my claims.

The detailed description of the particular embodiments of the invention illustrated and described herein is not to be construed as limiting the invention thereto. The invention includes all features of patentable novelty residing in the foregoing description and the accompanying drawings.

I claim:

1. An open beaded pneumatic tire comprising a tread and sidewalls, said sidewalls terminating in beads, each of said beads having a rim contacting surface characterized by one or more of said beads having in combination a hooked shape, said hooked shape bead composed of extensible material and having a recess wherein a tensioning device can be located and tensioned to an airtight fit of said hooked bead to a rim, said hooked bead having embedded in its open end a plurality of ring shaped compression and tension resistant material to resist the pulling of said open end under said tensioning device when the said tire is inflated.

2. A tire as in claim 1 further characterized by said tire having a plurality of cross section tension resistant carcass reinforcements impregnated in extensible material to a tire shape of one or more plies, said cross sectionwise reinforcements to be anchored in said hooked beads to said ring shape material in said hooked bead open end, and said reinforcements to be anchored in substantially inextensible usual tire beads to the usual tire bead wire core.

3. A tire as in claim 2, further characterized by said tire having a plurality of tire carcass circumferential wheel rolling direction reinforcements impregnated in extensible material with said cross section reinforcements to a tire cap and sidewall shape, consisting of one or more plies and extending radially from said tire cap to the inextensible bead on one side of said tire and a lesser radial distance from said tire cap on the other side of the tire, said other side of the tire terminating in a hooked bead.

4. A tire as in claim 3, further characterized by said tire having an anchoring wire located at said beginning and terminating points of said tire rolling circumferential reinforcements running parallel to said tire rolling circumferential reinforcements to which said wire, the said cross section reinforcements can anchor.

5. In open beaded pneumatic tires, a carcass reinforcement pattern consisting of a plurality of tire cross section nylon reinforcements impregnated in an extensible material to a tire shape of one or more plies, said reinforcements anchored in substantially inextensible tire beads to the bead wires and anchored in hooked beads having recesses for tensioning devices to a plurality of ring shaped compression and tension resistant material located in the open end section of said hooked beads, said ring being of sufficient size to effectively resist being pulled under said tensioning device when said tire is inflated.

6. A tire carcass reinforcement pattern as in claim 5, said tire reinforcement pattern further characterized by a plurality of tension resistant nylon reinforcements running in a tire rolling circumferential direction beginning in said tire sidewalls approximately at a point where the tire rolling circumference is 3 inches or more than the hooked bead circumference, as tire use may require, and continuing to approximately a like location in the opposite tire sidewall that terminates in a like hooked bead, but all the way to a substantially inextensible tire bead, said wheel rolling circumferential reinforcements impregnated in the same ply or plies as said cross section reinforcements whereby said area containing both of said direction reinforcements is substantially inextensible whereas the area with only cross section reinforcements is extensible throughout an annulus adjacent to said hooked beads.

7. A tire carcass reinforcement pattern as in claim 6, further characterized by an anchoring wire running in the wheel rolling circumferential direction parallel to and located at said beginning and terminating points of said wheel rolling circumferential carcass reinforcements to which said wire the said cross section tire carcass reinforcements traversing the said inextensible tire areas and the said extensible tire areas can anchor.

References Cited in the file of this patent
UNITED STATES PATENTS

| | | |
|---|---|---|
| 474,453 | Linder | May 10, 1892 |
| 485,605 | Brown | Nov. 8, 1892 |
| 525,081 | Keating | Aug. 28, 1894 |
| 738,415 | Dages | Sept. 8, 1903 |
| 1,305,196 | Cole | May 27, 1919 |
| 1,455,857 | Bennett et al. | May 22, 1923 |
| 1,642,143 | Doyle | Sept. 13, 1927 |
| 1,827,668 | Musselman | Oct. 13, 1931 |
| 2,224,066 | Shore | Dec. 3, 1940 |
| 2,262,780 | Sherwood | Nov. 18, 1941 |